(No Model.)
T. F. TIMBY.
STEAM COOKER.
No. 273,913. Patented Mar. 13, 1883.
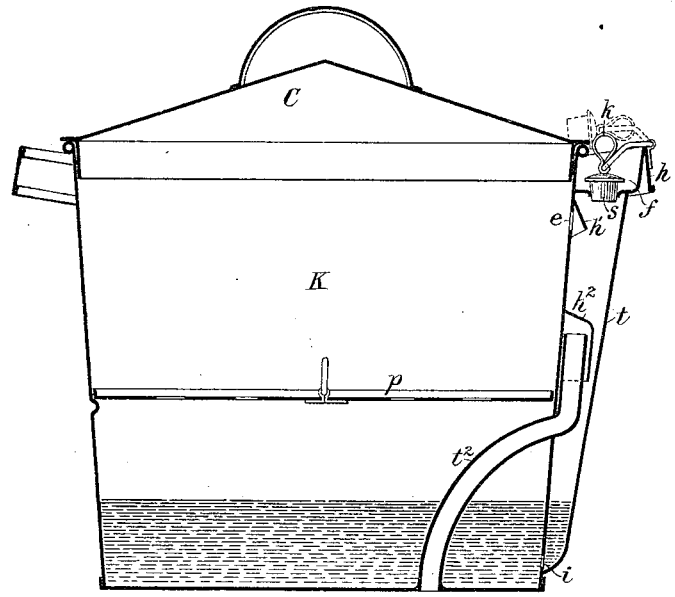
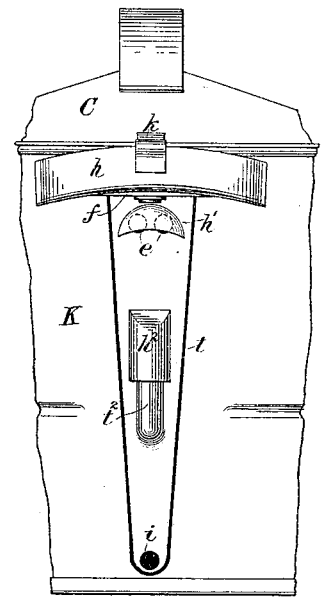
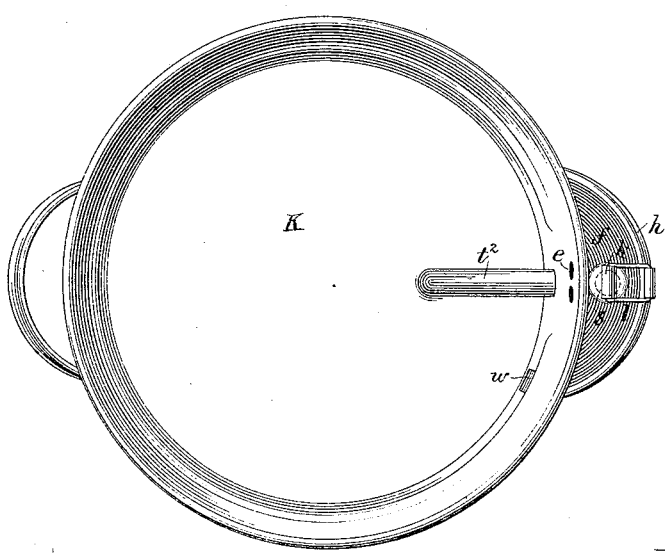
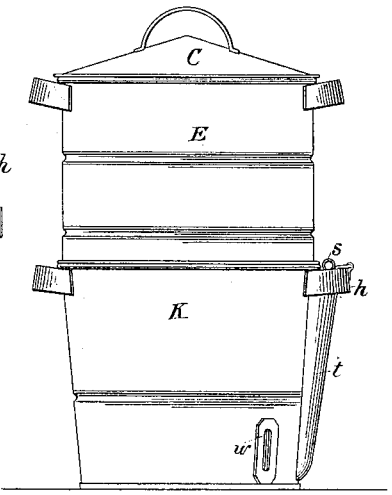
WITNESSES
Wm A. Skinkle
Geo. W. Breck
INVENTOR
Theodore F. Timby,
By his Attorney,

UNITED STATES PATENT OFFICE.

THEODORE F. TIMBY, OF BROOKLYN, NEW YORK.

STEAM-COOKER.

SPECIFICATION forming part of Letters Patent No. 273,913, dated March 13, 1883.

Application filed January 8, 1883. (No model.)

*To all whom it may concern:*

Be it known that I, THEODORE F. TIMBY, a citizen of the United States, residing at Brooklyn, in the State of New York, have invented a new and useful Improvement in Steam-Cookers, of which the following is a specification.

This invention relates to the construction of those cooking utensils known as "steam-cookers," in which articles of food are cooked through the medium of steam without liability to burn, and with less loss of weight and of nutritious qualities than they sustain when exposed to dry heat or immersed in liquids, and without the escape of smell or odor into the room in which the cooking is done. Provision is made for the escape of the surplus steam into the fire-space beneath the "steam-kettle," and therewith any odors which may escape from the interior must pass into the flames by which the kettle is heated, and they are thereby effectually consumed or deodorized, even upon gas-stoves and oil-stoves. But a serious difficulty heretofore has grown out of the "dampening" effect of the escaping steam upon the fire, which sometimes renders it difficult to maintain the requisite high degree of heat below the kettle. Another difficulty in shipping or delivering steam-cookers having external tubes or conduits, which are common to most of them, has grown out of the exposure of said tubes to knocks or blows, causing them to be dented, and their efficiency as well as their appearance impaired.

My present invention consists in certain novel features of construction, hereinafter described and claimed, whereby I aim to remedy said defects, and also to facilitate supplying the kettle with water from time to time by means more convenient than those heretofore used for this purpose.

On a sheet of drawings accompanying this specification, and forming part thereof, Figure 1 is a vertical section of the kettle of my steam-cooker with the cover applied thereto, illustrating its construction and operation. Fig. 2 is a top view of said kettle empty. Fig. 3 is a fragmentary sectional side view thereof; and Fig. 4 is a small front elevation of the steam-cooker, showing one extension between said kettle and the cover, illustrating its external appearance and its use with one or more such extensions in customary manner.

Like letters of reference indicate corresponding parts in the several figures.

My steam-cooker is composed of a steam-kettle, K, and a tight-fitting cover, C, therefor, with or without one or more extensions, E, Fig. 4, as shown in said drawings, the whole to be made chiefly of suitable tin, like other tinware cooking utensils, with or without a bottom of copper instead of tin, or other substitutions of materials and changes of shape and proportions, which are immaterial modifications. The said steam-kettle K, which embodies the aforesaid novel features of construction, has in its lower portion the customary water-gage window, $w$, Fig. 4, of mica. It also has the customary loose horizontal partitions, $p$, Fig. 1, of perforated sheet metal, (one or more,) and the customary pair of external bow-handles by which to handle it. Within one of the kettle-handles (marked $h$) I secure a flat lune-shaped funnel, $f$, the top of which fills the top of the handle, while, owing to its taper and less depth than the handle, it allows the latter to be readily grasped. A filling-funnel of ample size is thus accommodated. The outlet in its bottom is furnished with a stopper, $s$, which may be of metal, and this is hinged to the upper edge of the handle by a loop or double link, $l$, of wire, and provided with a thumb-piece or knob, $k$, to facilitate withdrawing and reinserting it. It is shown seated in full lines in Fig. 1, and in dotted lines is represented in an elevated position, in which it is conveniently left while pouring in water. Lifting the stopper by its knob and then dropping it causes it to enter the funnel-outlet, where it may be more tightly seated by tapping upon it.

The water is conducted into the kettle in customary manner through an inlet, $i$, below the water-level, as maintained therein with the aid of said customary water-gage, $w$; but I do this by means of a tube or conduit, $t$, soldered to the side of the kettle below and in line with said handle $h$, so proportioned and formed as to embrace said inlet $i$ by its lower end, while its upper end is tightly soldered to the bottom of said funnel $f$ and embraces the outlet of the latter. Owing to this location of said tube, it is effectively guarded against indentation by the arched and strongly-wired handle projecting above and in line therewith, as the latter naturally, owing to its greater prominence, comes in contact with the walls of cars, packing-cases, and the like in transit and in store, against which the tube would otherwise impinge to its detriment, and the contact of the handle with such objects will usually prevent any contact of said tube, which is the only external tube of my steam-cooker.

I provide for the escape of surplus steam, and therewith the escape of odors, from the interior of the kettle into said tube $t$, by one or more simple escape-holes, $e$, Figs. 1 to 3, near the top of the kettle, in that side thereof to which said tube is attached. These holes I guard externally within said tube by a hood, $h'$, attached above them to the kettle-side. This tends to direct the escaping steam downward within the tube, and to lessen its likelihood of escaping through the funnel $f$ when the stopper $s$ is withdrawn to admit water. For a communication with the flame-space below the kettle, I employ the customary tube, $t^2$, extending obliquely through the lower portion or water-space of the kettle, below the lowest partition or shelf, $p$; but instead of forming a continuous or practically continuous connection between the upper end of this tube and the interior of the kettle, as heretofore, I extend its upper end vertically within said tube $t$, and attach to the side of the kettle, so as to embrace this upturned end, a downwardly-projecting hood, $h^2$, within which the steam must enter from below, after contact with the relatively cool water within said tube, and with the cooler outer walls thereof, before it or any part thereof can enter said escape-tube $t^2$. Finally, there enters the latter, not the wet steam escaping through said holes $e$ into said tube $t$, but dried steam, which is further dried or superheated in passing through the hottest part of the kettle in said tube $t^2$, and escapes into the flame-space, together with any odors which may escape, invisibly and without detriment to the fire. The operation within the tube $t$ may be described as "water separation," and results, furthermore, in a material saving in the consumption of water, which renders less frequent replenishing with water sufficient, and correspondingly increases the adaptation of steam-cookers to be left to do their work without attention.

I have described somewhat in detail the mechanical construction which I have adopted after experiments, and as the result of experience; but I do not consider such details essential to my invention, except as hereinafter provided in my claims; and I consider any connection of said escape-tube $t^2$ with said water-tube $t$ which compels the steam to pass downward and then upward before escaping downward through the former a substantial equivalent of said hood $h^2$ and the upturned end of said tube $t^2$ within it. For example, I may bend said tube $t^2$ so as to accomplish the same result in like manner, the effect aimed at being the separation of water from the escaping steam, as aforesaid.

I claim as new and desire to patent under this specification—

1. A steam-cooker having its steam-kettle provided with an external water-tube, connected with the interior of the kettle, near the bottom of the latter, by a water-inlet, and near the top of the kettle by one or more escape-holes, and connected by a water-separator at an intermediate point with an escape-tube, which conducts the dried surplus steam and escaping odors from said water-tube downward through the interior of the kettle and through its bottom, substantially as herein specified, for the purposes set forth.

2. A steam-kettle of sheet metal, having its external tube, $t$, attached below and in line with a handle, $h$, which projects laterally beyond said tube and guards the latter, substantially as herein specified.

3. A steam-kettle having an external bow-handle, $h$, provided internally with a filling-funnel, $f$, having a stopper, $s$, in combination with a water-tube, $t$, extending downward below said handle, substantially as herein specified, for the purposes set forth.

THEODORE F. TIMBY.

Witnesses:
JAS. L. EWIN,
JANIE KING EWIN.